United States Patent [19]

Sifferlen et al.

[11] 4,200,872
[45] Apr. 29, 1980

[54] DOPPLER COMPENSATED DIGITAL NON-LINEAR WAVEFORM GENERATOR APPARATUS

[75] Inventors: Thomas P. Sifferlen; Fritz Steudel, both of Sudbury, Mass.

[73] Assignee: The United States of America as represented by the Secretary of the Air Force, Washington, D.C.

[21] Appl. No.: 968,895

[22] Filed: Dec. 13, 1978

[51] Int. Cl.² .......................... G01S 9/02; G01S 7/28
[52] U.S. Cl. ............................. 343/7.5; 343/17.2 PC
[58] Field of Search ............. 343/7.5, 7.7, 8, 17.2 PC

[56] References Cited

U.S. PATENT DOCUMENTS

| 3,680,105 | 7/1972 | Goldstone | 343/17.2 PC |
|---|---|---|---|
| 3,992,709 | 11/1976 | Watanabe et al. | 343/7.5 |
| 4,028,700 | 6/1977 | Carey et al. | 343/17.2 PC |

OTHER PUBLICATIONS

E. L. Key et al., Lincoln Laboratory Mit, Tech Report #207, 8-1959, 343-17.2 PC.

Primary Examiner—S. C. Buczinski
Attorney, Agent, or Firm—Joseph E. Rusz; William Stepanishen

[57] ABSTRACT

A non-linear digital waveform generator apparatus utilizing a variable clock to produce a predistorted transmission signal which is opposite to the distortion that is produced by the target's velocity.

4 Claims, 6 Drawing Figures

FIG.5a  NONLINEAR WEIGHTING IN FREQUENCY

NON-LINEAR FREQUENCY FUNCTION PIECE-WISE LINEAR REPRESENTATION

DOPPLER COMPENSATED DIGITAL NON-LINEAR WAVEFORM GENERATOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a digital waveform generator, and in particular to a non-linear digital waveform generator apparatus compensating for the Doppler dispersion due to a target's velocity.

In the prior art, the Doppler effect wherein a change occurs in the frequence of a detected sound, light or other electromagnetic wave which is caused by the relative motion between the source and the receiver, is well known. The Doppler effect has been utilized in many ways including airborne systems which are used to determine the velocity of the vehicle relative to the ground for such purposes as aerial mapping, bombing and navigation. Many ground-based radars utilize the effect to measure the relative velocity of a moving radar target with respect to the radar system. These radar units are operated upon the principle that the Doppler frequency shift in a target return is proportional to the radial component of the target velocity. However, target returns from a moving object are often masked or obscured by the effects of Doppler dispersion. Transmitted signals such as pulsed frequency modulated radar signals are comprised of varying frequencies which frequencies experience the greatest Doppler shift. The present invention provides a waveform generator apparatus to correct the effects of Doppler dispersion in target returns from a moving target.

SUMMARY OF THE INVENTION

The present invention utilizes a digital waveform generator for Doppler compensation of waveforms to correct for dispersion due to target velocity. The apparatus utilizes a modified binary rate multiplier to produce an accurate clock signal that is related to target velocity. This variable or Doppler clock is used to drive a digital waveform generator to produce a signal for transmission that is predistorted in an opposite sense from the distortion or dispersion that is due to the target velocity. As a result, the return signal from the target has a zero Doppler appearance, which enhances signal processing. The present apparatus also includes a digital method for generating non-linear chirp waveforms. An advantage of using a non-linear chirp in radar is that pulse compression can be performed without incurring the 1 to 1.5 dB loss associated with weighting a linear FM pulse. However, non-linear chirp waveforms are limited to situations where target Doppler is small and/or the transmitted pulse length is short, or where compensation for target motion can be employed. The present method of Doppler compensation is applicable to all types of digital waveform generation, including linear and non-linear chirp waveforms.

It is one object of the present invention, therefore, to provide an improved digital waveform generator apparatus having a digital method for compensating target returns subject to Doppler dispersion.

It is another object of the invention to provide an improved digital waveform generator apparatus that substantially improves data processing of return signals from targets with large velocities.

It is yet another object of the invention to provide an improved digital waveform generator apparatus which is economical to produce and utilizes conventional currently available components that lend themselves to standard mass production manufacturing techniques.

These and other advantages, objects and features of the invention will become more apparent after considering the following description taken in conjunction with the illustrative embodiment in the accompanying drawings.

BRIEF DESCRIPTION OF THE DRAWINGS

FIGS. 5a and 5b are graphical representations, respectively, of the square root Hamming weighting and linear approximation functions utilized in the present apparatus.

DESCRIPTION OF THE PREFERRED EMBODIMENT

Figure 1:
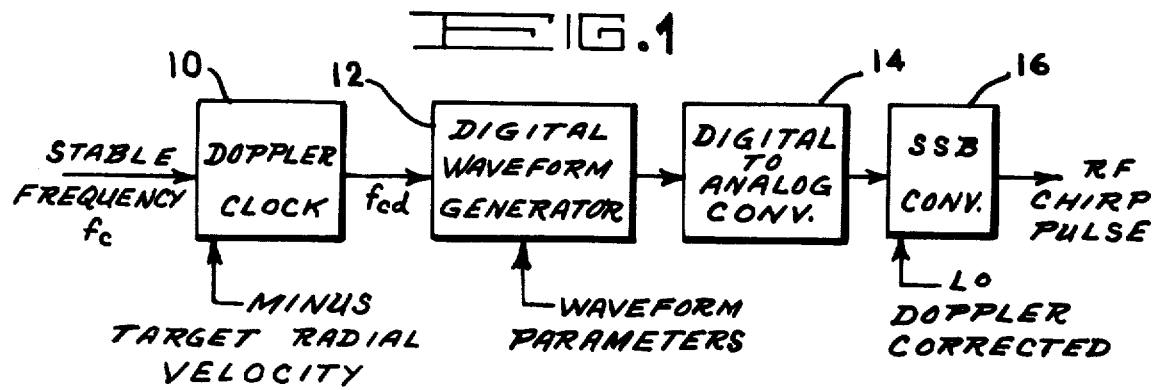
FIG. 1 is a block diagram of the Doppler compensated digital waveform generator apparatus in accordance with the present invention.

Referring now to FIG. 1, there is shown a digital waveform generator apparatus utilizing a Doppler clock 10 which receives a pair of input signals, frequency, $F_c$, and target radial velocity. The digital waveform generator 12 receives the output signal, $F_{cd}$, from the Doppler clock 12 and waveform parameters. The D/A converter 14 which is connected to the waveform generator 12, provides an analog signal to the single side band (SSB) converter 16. A Doppler corrected local oscillator signal is applied to the SSB converter 16 whose output is an RF chirp pulse.

The Doppler compensated waveform generator apparatus operates in the following manner. The result of target motion on a radar pulse is a change in the time scale of the waveform in the time domain; i.e., the waveform s(t) is replaced by $$s\left(t \frac{(c+v)}{(c-v)}\right)$$

for an incoming target, and $$s\left(t \frac{(c-v)}{(c+v)}\right)$$

for an outgoing target, where v is the target velocity, and c is the speed of light. This effect either shortens or lengthens the time waveform. Correspondingly, the spectrum of s(t), i.e., H(f), is shifted to $$H\left(f \frac{(c-v)}{(c+v)}\right) \text{ or } H\left(f \frac{(c+v)}{(c-v)}\right),$$

respectively. Compensation for this affect may be applied to the transmitted waveform, in the opposite sense of the target Doppler shift, so the resultant received waveform is s(t). Thus, for signal processing, this allows the phase of the matched filter to be set for the undistorted waveform.

In the present invention, Doppler compensation is applied in two places; to the waveform generator 12 which produces the waveform at baseband, and to the local oscillator (LO) which is used to translate the signal to RF for transmission. This is based on a transmitted signal which comprises a CW carrier and a modulating signal. Let the transmitted frequency be $$f_T = f_o + f_m$$

then the received frequency is $$f_R = f_o \frac{(c + v)}{(c - v)} + f_m \frac{(c + v)}{(c - v)}$$

To compensate for this dispersion, the local oscillator is selected to produce a carrier of $$f_o \frac{(c - v)}{(c + v)}$$

and the modulating signal is generated at baseband $$s_m \left( \frac{(c - v)}{(c + v)} t \right).$$

The digital waveform generator 12 generates N samples of the waveform at baseband. These samples are D/A converted and frequency translated to RF using a single-side-band modulator and mixers. If the generator were running at a clock frequency $f_c$, a zero Doppler baseband waveform is generated. To compensate for Doppler, the clocking frequency is $$f_{cd} = f_c \frac{(c - v)}{(c + v)} \approx f_c \left( 1 - \frac{2v}{c} \right)$$

or $$f_{cd} = f_c \frac{(c + v)}{(c - v)} \approx f_c \left( 1 + \frac{2v}{c} \right)$$

depending upon the direction of target motion.

If the waveform is generated with a 10 MHz clock ($f_c = 10$ MHz), then a 1000 μs pulse will contain 10,000 samples. For the Doppler shifted waveform to contain the same number of samples, then the clock period must be reduced (or increased) by the factor (1±2V/c). Therefore, the Doppler clock output $$f_{cd} = f_c \left( 1 \mp \frac{2v}{c} \right)$$

$$= f_c \mp \frac{2v}{c} f_c$$

For $F_c = 10$ MHz and assuming a maximum target velocity of ±7500 m/s, then $$\Delta f_c = \mp 2v/c; f_c = \mp 500 \text{ Hz}$$

The range of the Doppler clock is ±500 Hz. This may be generated at baseband and single-side-band converted to 10 MHz; or it can be generated at an intermediate frequency, such as 2 MHz ±500 Hz, and then converted to a 10 MHz center frequency. The actual frequencies involved, the settling time, and filtering requirements would dictate which method to use.

In systems using linear chirp waveforms, the dispersion due to target motion results in changing the chirp frequency slope. Compensation for Doppler in a linear chirp generator may then also be performed by changing the input frequency-slope constant in the opposite sense to the target radial velocity. This allows operation of the waveform generator with the same fixed frequency clock. However, it does not compensate for the change in pulse length due to Doppler, which is usually negligible, when using a fixed number of samples in the waveform.

The carrier frequency, or center frequency of the chirp, $f_o$, may also be compensated for the Doppler shift. For example, using a carrier frequency of $f_o = 1275$ MHz, and a maximum target velocity of ±7500 m/s, the following may be shown:

$$\Delta f_o = f_d = \mp \frac{2v}{c} (f_o)$$

$$= \mp 63.75 \text{ kHz}$$

This is the deviation of modulation which is required on the local oscillator (LO) in mixing the baseband waveform to RF. It is also possible that the Doppler LO frequency may be obtained by multiplying $f_{cd}$ by some scale factor (not frequency translation). However, depending on the actual frequencies used and the filter requirements, it may be more convenient to generate these signals using separate Doppler clocks and then translate to the proper frequency. These signals will be coherent since they both will be generated using the same stable clock frequency $f_c$.

Figure 3:
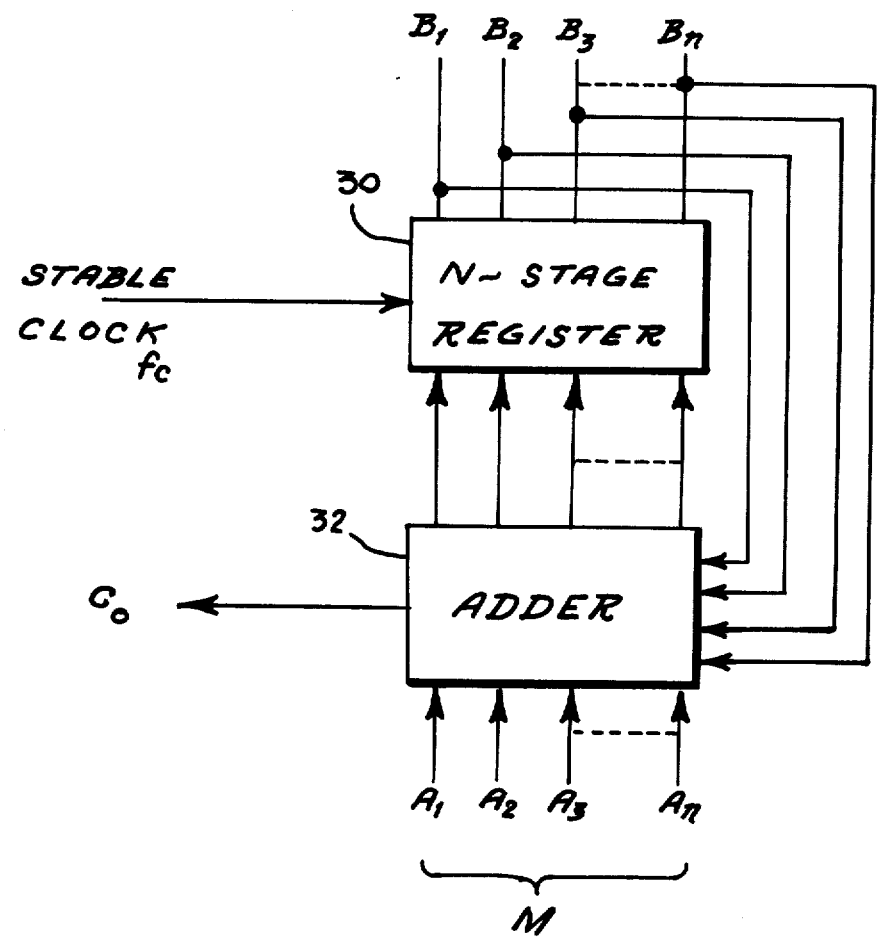
FIG. 3 is a block diagram of the binary rate multiplier unit utilized in the Doppler clock.
Figure 2:
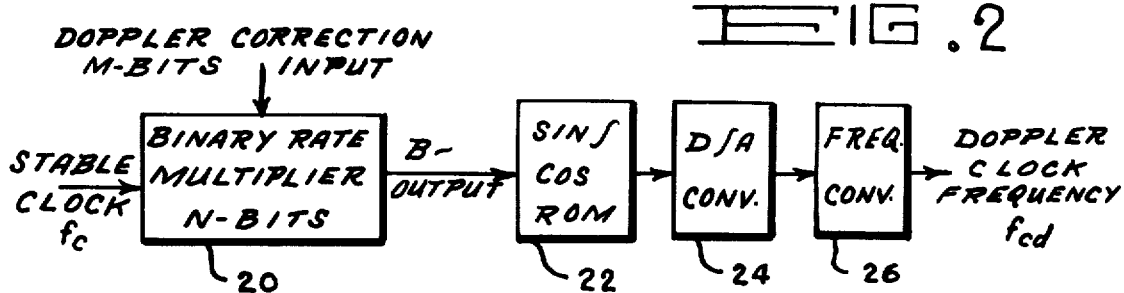
FIG. 2 is a block diagram of the Doppler clock which is utilized in the digital waveform generator apparatus.

Turning now to FIG. 2, there is shown the Doppler clock which is used to drive the digital waveform generator, or to produce the Doppler LO frequency, has a CW output whose frequency is a function of the target velocity. These variable frequencies are generated in a modified binary rate multiplier 20. The binary rate multiplier, which is shown in greater detail in FIG. 3, generates M output pulses ($C_o$, the carry output from the adder) for each input group of $2^n$ clock pulses, where n is the number of stages in the register 30. The multiplication factor is therefore $M/2^n$, i.e., the output frequency is equal to the input clock frequency, $f_c$, times $M/2^n$. This multiplication factor can therefore range from 0 to $(2^n - 1)/2^n$, in increments of $\frac{1}{2^n}$, where M can range from 0 to $2^n - 1$. As an example, assuming a 20-bit register and $f_c = 10$ MHz, then the lowest frequency increment is $(1/2^{20}) \times 10^7 = 9.536743$ Hz.

The phase value of the output frequency is contained as the B data in the register. The phase accumulation is modulo $2\pi$, with each cycle indicated by an output from the carryout ($C_o$) of the adder 32. However, the $C_o$ output pulses are not spaced at equal intervals of $1/f_{cd}$, which is characteristic of the binary rate multiplier. The output pulses are spaced at multiples of the clock period, i.e. $\times T_c$, with the correct average number. To obtain the Doppler clock pulses spaced at exactly $1/f_{cd}$ (i.e., within the accuracy of the stable frequency $f_c$), a sine wave of frequency $f_{cd}$ is constructed, and amplified and clipped to obtain a square wave for use as a clocking signal. This is accomplished by applying the B value phase samples to a sine/cosine look-up table (ROM) 22 in FIG. 2 to generate amplitude samples. The amplitude samples are then applied to D/A converter unit 26 to obtain the analog waveform which is then mixed coherently in frequency converter 26 to the appropriate center frequency.

In the above example, 20 bits were used in the phase register to obtain a 9.5 Hz frequency resolution, however, that number of bits is not required for the D/A converter. The number of bits used in the D/A converter is approximately 9, and is determined by the acceptable signal-to-quantization-noise ratio. This in turn then relates to the phase jitter of the signal. For example, an 8-bit D/A converter will only contribute approximately 0.22° peak phase jitter at a 10 MHz clock rate, which amounts to approximately 0.6 ns of peak time jitter.

Figure 4:
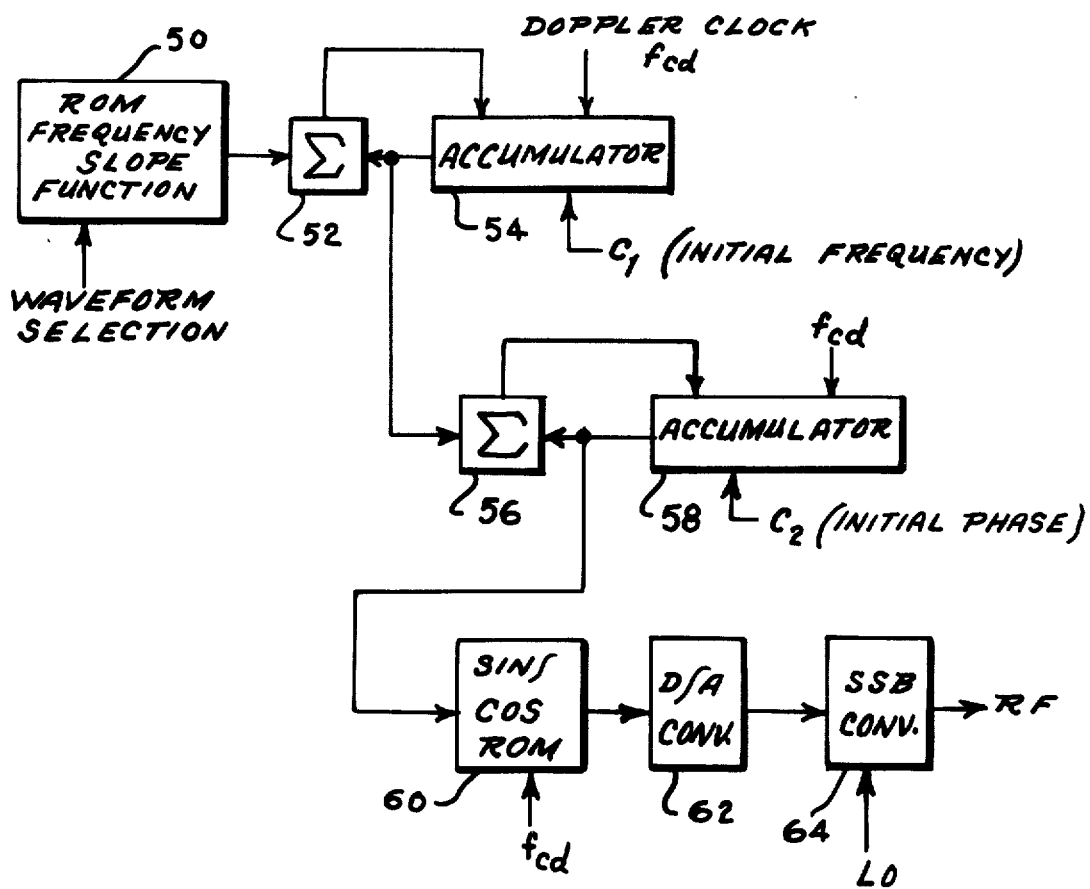
FIG. 4 is a block diagram of the non-linear chirp waveform generator.

In applications where a non-linear chirp pulse is required, a non-linear chirp generator may be utilized in the present apparatus. There is shown in FIG. 4 a block diagram of a non-linear waveform generator. The characteristics of the non-linear frequency function are stored in a ROM 50 in the form of frequency slopes. This may be done for each different waveform type which is used in the system. The operations performed by the present apparatus are a double integration of the frequency slope to obtain the phase function. The numerical integrations are performed respectively in the summation and accumulation circuits 52, 54, 56 and 58. The phase function which is modulo $2\pi$ (the accumulators are constructed as modulo $2\pi$) are used to address sine and cosine ROM 60 which generate digital amplitude samples of the waveform in quadrature at baseband. These samples are digital-to-analog converted and filtered in converter unit 62, and then converted to RF using a single-sideband modulator 64. In order to generate a linear chirp, the input function is replaced by a single constant representing the linear frequency slope.

Figure 5B:
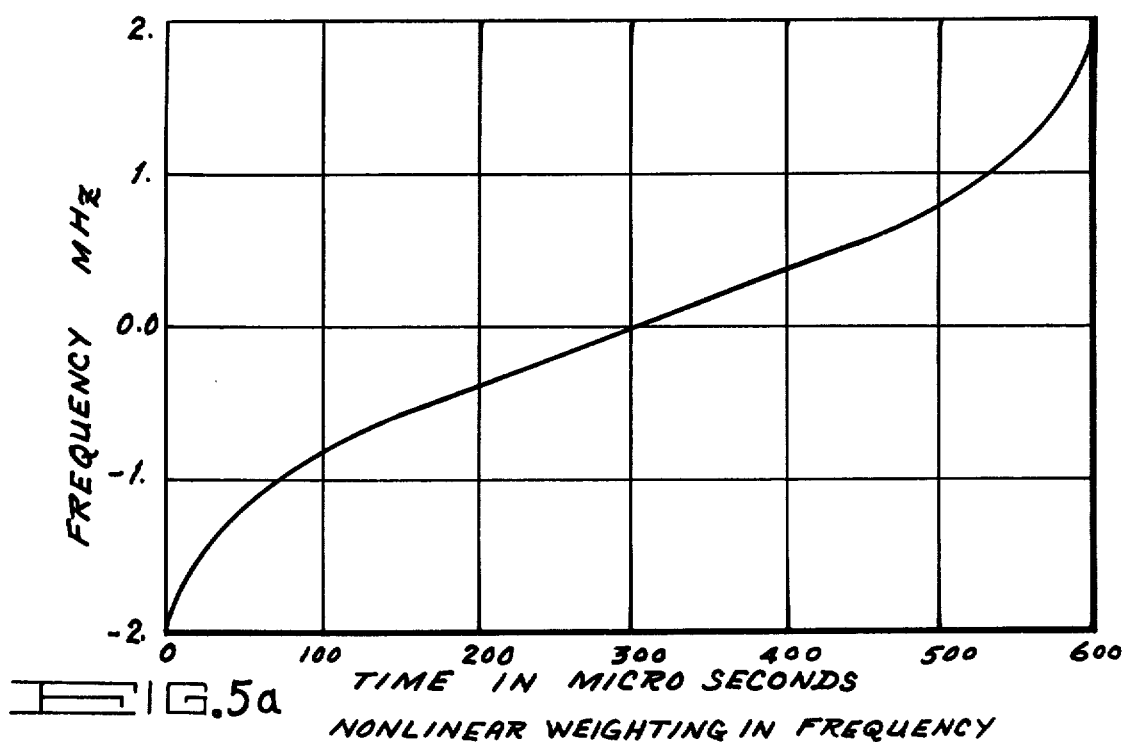
Figure 5B:
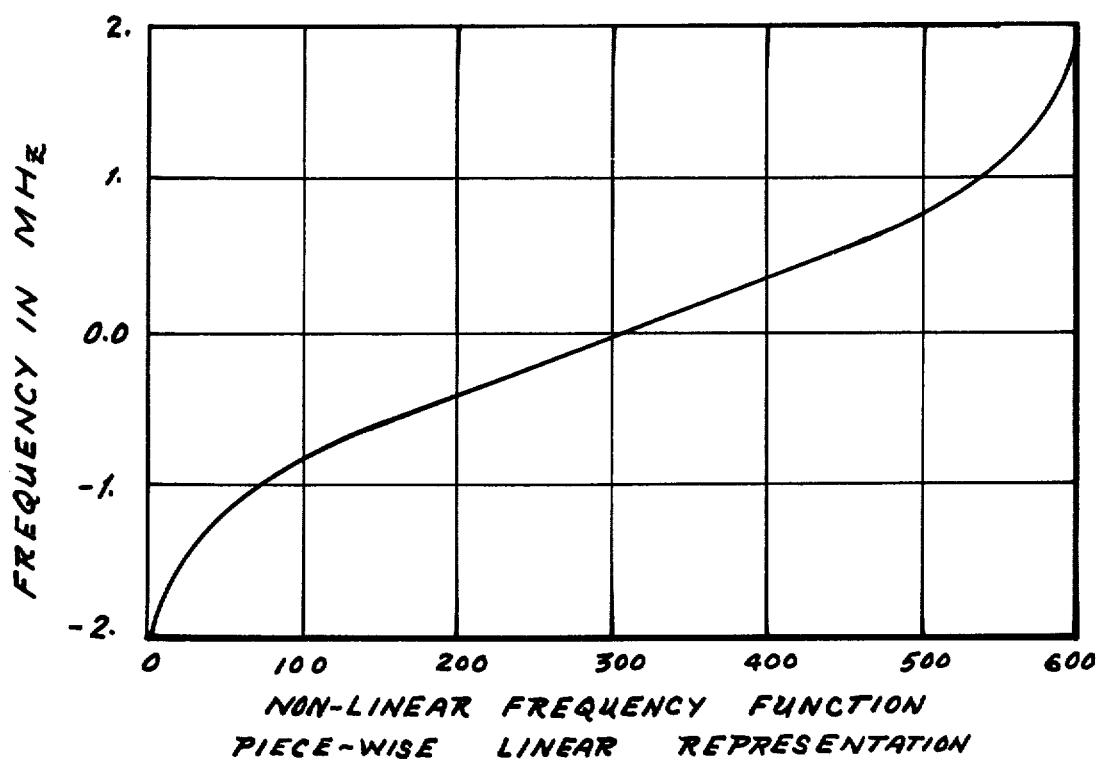

A typical non-linear frequency function which is shown in FIG. 5a is a square root of Hamming weighting in frequency. For the digital waveform generator a piece-wise linear approximation of the function is used. An approximation may be made with a few line segments, approximately twenty. The slopes of these line segments are stored in a ROM, along with the sampling duration that each slope is used. The data for many waveform types may be stored on an integrated circuit ROM. The $C_1$ and $C_2$ constants which are shown in FIG. 4 may be stored for each waveform. These constants are required for the numerical integration; $C_1$ includes the initial frequency value, and $C_2$, initial phase.

During waveform generation, the ROM is sequentially addressed and the slope value is used for the indicated number of samples. The value for the number of samples is counted down in a counter and the output used to obtain the next ROM slope word to the integrator. The process sequences through the entire waveform. This entire operation, including the integrators and D/A converter inputs, are driven from the Doppler clock to predistort the waveform to compensate for the target velocity.

Although the invention has been described with reference to a particular embodiment, it will be understood to those skilled in the art that the invention is capable of a variety of alternative embodiments within the spirit and scope of the appended claims.

What is claimed is:

1. In a radar system, a Doppler compensated digital waveform generator apparatus comprising in combination:

a clock means for receiving a stable frequency and target radial velocity data, said clock means combining said stable frequency and said target radial velocity data to provide a CW output signal, said CW output signal comprising a frequency which is a function of target velocity, means for generating a digital waveform, said digital waveform generating means receiving said CW output signal and waveform data, said digital waveform generating means being responsive to said CW output signal and said waveform data to provide a digital waveform output signal, a d/a converter means connected to said digital waveform generating means to receive said digital waveform output signal, said d/a converter means converting said digital waveform output signal to an analog output signal, and, a single-sideband converter means translating said analog output signal to an RF output.

2. A digital waveform generator apparatus as described in claim 1 wherein said clock means comprises in combination:

a binary rate multiplier means receiving said stable frequency and a predetermined number of Doppler correction bits, said binary rate multiplier means multiplying said stable frequency with said Doppler correction bits to provide a binary output signal, a sin/cosine read-only memory receiving said binary output signal, said sin/cosine read-only memory generating amplitude samples, a d/a converter receiving and converting said amplitude samples to an analog signal, and, a frequency converter receiving said analog signal, said frequeny converter providing a clock signal in response to said analog signal.

3. A digital waveform generator apparatus as described in claim 1 wherein said digital waveform generating means provides a linear digital waveform output signal.

4. A digital waveform generator apparatus as described in claim 1 wherein said digital waveform generating means provides a non-linear digital waveform output signal.

* * * * *